United States Patent
Stewart et al.

(10) Patent No.: US 10,585,665 B2
(45) Date of Patent: *Mar. 10, 2020

(54) SETTING A BUILD INDICATOR TO ENABLE OR DISABLE A FEATURE

(71) Applicant: HEWLETT-PACKARD DEVELOPMENT COMPANY, L.P., Houston, TX (US)

(72) Inventors: Christopher H. Stewart, Houston, TX (US); Mason Gunyuzlu, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 131 days.

This patent is subject to a terminal disclaimer.

(21) Appl. No.: 15/861,403

(22) Filed: Jan. 3, 2018

(65) Prior Publication Data

US 2018/0129496 A1    May 10, 2018

Related U.S. Application Data

(63) Continuation of application No. 14/923,040, filed on Oct. 26, 2015, now Pat. No. 9,904,543.

(51) Int. Cl.
*G06F 8/71* (2018.01)

(52) U.S. Cl.
CPC .................... *G06F 8/71* (2013.01)

(58) Field of Classification Search
CPC ... G06Q 20/3821; G06Q 20/3829; G06F 8/71
USPC ....................................................... 717/107
See application file for complete search history.

(56) References Cited

U.S. PATENT DOCUMENTS

| 5,960,198 | A  | * | 9/1999  | Roediger ............ G06F 11/3612 |
|           |    |   |         | 717/130 |
| 6,272,537 | B1 |   | 8/2001  | Kekic |
| 6,427,234 | B1 | * | 7/2002  | Chambers ........... G06F 9/45516 |
|           |    |   |         | 717/140 |
| 6,487,713 | B1 | * | 11/2002 | Cohen ....................... G06F 8/34 |
|           |    |   |         | 717/105 |
| 6,651,188 | B2 |   | 11/2003 | Harding et al. |

(Continued)

FOREIGN PATENT DOCUMENTS

| CN | 101320342 A | 12/2008 |
| TW | 530265 B    | 5/2003  |

(Continued)

OTHER PUBLICATIONS

Clarke et al., "A Historical Perspective on Runtime Assertion Checking in Software Development", May 2006, ACM, vol. 31, No. 3 (Year: 2006).*

(Continued)

*Primary Examiner* — Wei Y Zhen
*Assistant Examiner* — Junchun Wu
(74) *Attorney, Agent, or Firm* — Trop, Pruner & Hu, P.C.

(57) ABSTRACT

A build indicator is set in a build environment to a set value for building a program code, the set value selected from a first value indicating that a feature of the program code is enabled, and a second value indicating that the feature is disabled. In response to the set value of the build indicator being the first value, a variable is set to a value indicating that the feature is enabled. The program code is built using the value of the variable.

18 Claims, 5 Drawing Sheets

(56) References Cited

U.S. PATENT DOCUMENTS

| | | | |
|---|---|---|---|
| 6,934,873 B2 | 8/2005 | Lu et al. | |
| 7,100,087 B2 | 8/2006 | Yang et al. | |
| 7,539,854 B2* | 5/2009 | Rothman | G06F 9/4411 707/999.003 |
| 7,698,546 B2* | 4/2010 | Stemen | G06F 9/4411 709/223 |
| 7,716,638 B2 | 5/2010 | Thornton | |
| 8,261,242 B2 | 9/2012 | Booth | |
| 8,935,683 B2* | 1/2015 | Brackman | G06F 9/44521 717/151 |
| 9,195,854 B2* | 11/2015 | Jain | G06F 21/604 |
| 9,213,661 B2* | 12/2015 | Coneski | G06F 13/385 |
| 9,880,925 B1* | 1/2018 | Bienkowski | G06F 11/3636 |
| 2002/0099974 A1 | 7/2002 | Lin | |
| 2003/0163323 A1* | 8/2003 | Bluvband | G06F 8/73 704/275 |
| 2005/0022159 A1* | 1/2005 | Aldrich | G06N 5/025 717/104 |
| 2005/0223374 A1* | 10/2005 | Wishart | G06F 11/1417 717/173 |
| 2006/0112374 A1* | 5/2006 | Oliva | G06F 9/44521 717/127 |
| 2006/0123259 A1 | 6/2006 | Yokota | |
| 2006/0195840 A1* | 8/2006 | Sundarrajan | G06F 8/61 717/176 |
| 2006/0259904 A1* | 11/2006 | Celli | G06F 8/61 717/174 |
| 2008/0276222 A1* | 11/2008 | Yamagami | G06F 11/1441 717/124 |
| 2008/0320439 A1 | 12/2008 | Son | |
| 2009/0007066 A1 | 1/2009 | Grechanik | |
| 2009/0125882 A1* | 5/2009 | Frigo | G06F 8/314 717/116 |
| 2009/0307667 A1 | 12/2009 | Booth | |
| 2010/0318962 A1 | 12/2010 | Jones | |
| 2011/0239186 A1* | 9/2011 | Zinkovsky | G06F 9/45516 717/107 |
| 2012/0311530 A1 | 12/2012 | Graviers | |
| 2013/0247013 A1* | 9/2013 | Farrell | G06F 11/3644 717/130 |
| 2013/0298109 A1* | 11/2013 | Trinchini | G06F 8/71 717/121 |
| 2014/0149969 A1 | 5/2014 | Brower | |
| 2014/0372988 A1* | 12/2014 | Fanning | G06F 11/3604 717/131 |
| 2015/0112739 A1 | 4/2015 | Pathak | |
| 2015/0301812 A1* | 10/2015 | Goetz | G06F 9/4488 717/146 |
| 2015/0339119 A1* | 11/2015 | Rehman | G06F 8/54 717/121 |
| 2015/0347669 A1* | 12/2015 | Kalte | G06F 17/5027 716/134 |
| 2016/0246594 A1* | 8/2016 | Shoavi | G06F 8/71 |

FOREIGN PATENT DOCUMENTS

| | | |
|---|---|---|
| TW | 200801964 A | 1/2008 |
| TW | 200928736 A | 7/2009 |

OTHER PUBLICATIONS

Andrade et al., "AspectJ-based Idioms for Flexible Feature Binding", 2003, IEEE (Year: 2003).*

Vetter et al., "Progress: a Toolkit for Interactive Program Steering", Aug. 1995, Georgia Institute of Technology (Year: 1995).*

Linsbauer et al., "Recovering Feature-to-Code Mappings in Mixed-Variability Software Systems", 2014, IEEE (Year: 2014).*

Cooper et al, National Institute of Standards and Technology, "BIOS Protection Guidelines", Apr. 2011 (26 pages).

Dit et al. "Feature Location in Source Code: A Taxonomy and Survey", 2011, CRC to Journal of Software Maintenance and Evolution. Research and Practice (54 pages).

Elkhodary et al. "A Framework for Engineering Self-Tuning Self-Adaptive Software Systems", 2010, ACM (10 pages).

HP, Datasheet, HP EliteDesk 705 G2 Small Form Factor PC, Sep. 2015 (5 pages).

Kuo et al. "Building and evaluating a location-based service recommendation system with a preference adjustment mechanism", 2008, Elsevier (12 pages).

Regenscheid, A, National Institute of Standards and Technology, "BIOS Protection Guidelines for Servers" Aug. 2014 (32 pages).

Zhao et al. "Spectral Feature Selection for Supervised and Unsupervised Learning", 2007, Department of Computer Science and Engineering, Arizona State University (8 pages).

* cited by examiner

SETTING A BUILD INDICATOR TO ENABLE OR DISABLE A FEATURE

CROSS REFERENCE TO RELATED APPLICATION

This is a continuation of U.S. application Ser. No. 14/923,040, filed Oct. 26, 2015, which is hereby incorporated by reference in their entirety.

BACKGROUND

An electronic device can include various different program modules that are executable in the electronic device to perform respective tasks. Examples of such program modules (which include machine-readable instructions) include a basic input/output system (BIOS), an operating system, an application, and so forth. The program modules can be built at the factory and can be provided with electronic devices shipped to consumers.

BRIEF DESCRIPTION OF THE DRAWINGS

Some implementations are described with respect to the following figures.

DETAILED DESCRIPTION

Figure 1:
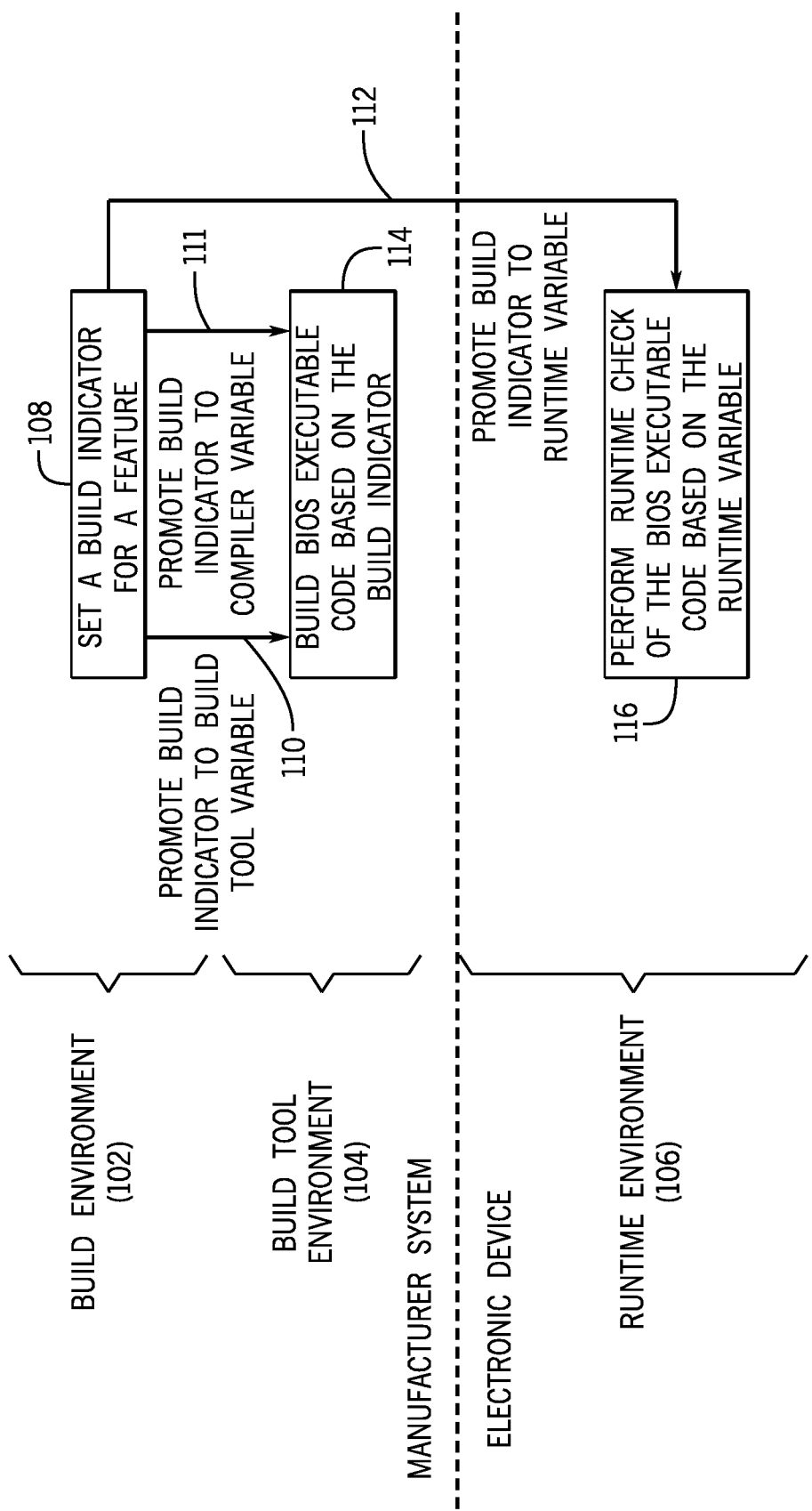
FIGS. 1 and 2 are block diagrams of example environments relating to building and running a program code, according to some implementations.

A manufacturer of an electronic device can build program code (including machine-readable instructions) that is to be included in the electronic device. For example, the program code can include a basic input/output system (BIOS) code, which is code that performs initialization of hardware electronic components (e.g. a processor, an input/output (I/O) controller, a peripheral device, etc.) of the electronic device and to boot the electronic device. In some examples, BIOS code can include Unified Extensible Firmware Interface (UEFI) code.

Although reference is made in the present discussion to a manufacturer of an electronic device building program code to provide with the electronic device to a consumer, it is noted that in other examples, a different entity can build the program code that is to be included in the electronic device. Thus, as used in the present disclosure, a "manufacturer" can refer to a manufacturer of electronic devices, a distributor of electronic devices, a provider of program code for inclusion into electronic devices, or any other entity that is responsible for building program code that is to be included in electronic devices.

Examples of electronic devices include computers (e.g. desktop computers, notebook computers, tablet computers), servers, smart phones, game appliances, wearable devices (e.g. smart watches, smart eyeglasses, etc.), vehicles, and so forth.

A manufacturer may decide whether or not a feature of a program code (e.g. BIOS code or other program code) for use in an electronic device is to be enabled or disabled. In some examples, the feature can include an automated recovery feature of the program code that restores the program code from a secure storage of the electronic device (or secure storage outside the given electronic device) in response to detecting that the program code has been corrupted.

As further examples, the feature can include a feature of an embedded controller (EC) of the electronic device programmed to contact a predetermined destination to address an issue of the electronic device. Such a feature can be referred to as an "EC phone home" feature. An EC can be implemented as a microcontroller or other hardware control circuit that is configured (e.g. programmed with firmware including machine-readable instructions) to perform predetermined tasks.

As additional examples, the feature can include a Netclone driver of a BIOS code, which accesses a network, such as the public Internet, to download an operating system onto a device.

Although a given feature (or given features) may be enabled in the program code of some electronic devices made by the manufacturer, the given feature(s) may be disabled in the program code of other electronic devices made by the manufacturer. For example, a given feature of the program code can be enabled in electronic devices sold in or shipped to a first geographic region, but disabled in the program code in electronic devices sold in or shipped to a second geographic region.

There are various phases associated with the manufacture and use of an electronic device. A first phase includes a build environment in which the manufacturer decides what features are to be enabled or disabled in a program code of the electronic device. A second phase includes a build tool environment in which a build tool is used to build the program code, where the built program code can have certain features enabled or disabled. A third phase includes a runtime environment in which the program code is executed in the electronic device during use by a consumer. Although several example phases are listed above, it is noted that in other examples, alternative and/or additional phases may be provided.

In some scenarios, the enabling or disabling of a feature in the program code may not be consistent across the multiple phases. For example, an indicator used by the build time tool or used during runtime indicating that the feature is to be enabled or disabled may not be consistent with a state of an indicator set in another phase. Such inconsistency can occur because configuration to enable or disable the feature of the program code is manually performed separately for the multiple phases, such that it is possible for the manual configuration for one of the phases to be inconsistent with the manual configuration in another of the phases.

In accordance with some implementations of the present disclosure, a build indicator in a build environment (corresponding to the first phase noted above) can be set to one of a first value (to indicate that the feature is enabled) and a second value (to indicate that the feature is disabled). An "indicator" can refer to a flag, parameter, data structure, or any other element whose value can be changed between two or more values to provide different indications.

The set value of the build indicator can be promoted to variables used in other environments (corresponding to the other phases noted above), including a build tool environment and a runtime environment. "Promoting" the value of the build indicator to a variable can refer to setting the value of the variable based on the value of the build indicator. A "variable" can refer to a flag, parameter, data structure, or any other element whose value can be changed between two or more values to provide different indications. Note that the term "indicator" and "variable" can be used interchangeably in the present disclosure.

In the build tool environment, a build tool can use a value of a build tool variable (promoted from the build indicator) to determine whether or not code modules (e.g. drivers or other types of modules that include machine-readable instructions) are to be enabled in the program code.

In the runtime environment, a runtime variable promoted from the build indicator can be used to perform a runtime check of the program code, and to determine which portions of the program code to use during execution of the program code—a first portion (or first path) of the program code can be used in response to a first value of the runtime variable, where the first portion (or first path) has the feature enabled, and a second portion (or second path) of the program code can be used in response to a second value of the runtime variable, where the second portion (or second path) has the feature disabled.

FIG. 1 shows various example environments associated with a program code (e.g. a BIOS code), including a build environment 102 and a build tool environment 104. The build environment 102 and the build tool environment 104 are environments used by a manufacturer that provides a program code (e.g. a BIOS code). The environments further include a runtime environment 106 of an electronic device in which the program code (e.g. BIOS code) is executable.

In the ensuing discussion, reference is made to building a BIOS code with a given feature (or features) selectively enabled or disabled. However, it is noted the techniques or mechanisms according to some implementations can be employed with other types of program code, such as an operating system, an application, a driver, or any other type of program code.

In the build environment 102, the manufacturer can set (at 108) an environment indicator (also referred to as a "build indicator") for a feature of a BIOS code. The build environment 102 can be a command line environment in some examples, where a command line interface can be displayed by a manufacturer system (e.g. a computer system or computer systems of the manufacturer). The manufacturer (or more specifically a user of the manufacturer) can provide a command in the command line interface. Through the command line interface, the user can submit a command to selectively set the build indicator to an enabled value or a disabled value, depending on whether or not a particular feature is to be enabled or disabled in the BIOS code. Although reference is made to setting the value of the build indicator to selectively enable or disable a feature in the BIOS code, it is noted that techniques or mechanisms according to some implementations can be applied to scenarios to selectively enable or disable multiple features of the BIOS code (or other program code), using one build indicator or multiple build indicators.

In other examples, instead of setting the value of the build indicator in a command line interface, a different user interface can be provided by the manufacturer system, such as a graphical user interface or other type of interface.

As further depicted in FIG. 1, the value of the build indicator set (at 108) is promoted (at 110) to a build tool variable, and also promoted (at 112) to a runtime variable. "Promoting" the value of the build indicator to the build tool variable or the runtime variable can include setting the value of the build tool variable or runtime variable based on the value of the build indicator. For example, if the build indicator is set to an enabled value to indicate that the feature is to be enabled in the BIOS code, then the build tool variable is set to a first value. On the other hand, if the build indicator is set to a disabled value indicating that the feature is to be disabled in the BIOS code, then the build tool variable is set to a second value. Similarly, if the build indicator is set to an enabled value, then the runtime variable is set to a first value. On the other hand, if the build indicator is set to a disabled value, then the runtime variable is set to a second value.

In the build tool environment 104, a build tool can be executed in the manufacturer system to build (at 114) a BIOS executable code based on the value of the build tool variable. In some examples, the build tool can be a build tool available in a UEFI development kit, such as a development kit provided by Intel to use for developing UEFI code. In other examples, other types of build tools can be employed. Any of such build tools can be modified to support using the value of the build variable in accordance with some implementations of the present disclosure, when building the BIOS executable code.

The BIOS executable code built (at 114) is in executable form, such as an executable binary file, an executable object code, and so forth, which is executable in an electronic device. As part of building the BIOS executable code, one or multiple code modules for a given feature (or given features) that is (are) to be enabled or disabled is(are) also provided. In an example where a code module includes at least a portion that relates to a given feature that is to be selectively enabled or disabled, the build tool can make a decision of whether or not to include the code module in the BIOS executable code based on the value of the build tool variable. If the code module is feature-specific (i.e., the code module includes machine-readable instructions for just the given feature), then the build tool can include the code module in the BIOS executable code if the value of the build tool variable is set to a first value, and to exclude the code module from the BIOS executable code if the value of the build tool variable is set to the second value.

In other examples, a code module that relates to a given feature that is to be selectively enabled or disabled can include machine-readable instructions for the given feature as well as machine-readable instructions for other tasks that are in addition to the given feature. In such a scenario, the code module has to be included in the BIOS executable code even if the build tool variable is set to the second value to indicate that the given feature is to be disabled. In such a scenario, the runtime variable can be used to determine at runtime which portion of the BIOS executable code to use (the portion with the given feature enabled or the portion of the given feature disabled).

The code module (or code modules) relating to a given feature that is to be enabled or disabled can be in the form of an executable code (e.g. an executable binary file, an executable object, etc.) or a source code (e.g. a source code according to the C programming language or other programming language). If a code module related to a given feature is an executable code, then compilation of the code module does not have to be performed, and a build tool can decide whether or not to include the code module based on the build tool variable. On the other hand, if the code module related to the given feature is in the form of a source code, then a compiler is invoked by the build tool to compile the code module into the BIOS executable code. In some examples, the compiler can invoke a preprocessor to determine whether or not the code module is to be included in the BIOS executable code. A preprocessor (e.g. a C preprocessor or other type of preprocessor) is used by a compiler to perform certain tasks as part of the compilation, where such tasks can include inserting header files, expanding macros, performing code translation, and so forth.

Although reference is made to using a preprocessor by a compiler in some examples, it is noted that in other examples, a compiler can compile a source code without using a preprocessor.

As further shown in FIG. 1, the value of the build indicator (set at 108) can also be promoted (at 111) to a compiler variable that can be used by the preprocessor invoked by the compiler. In some examples, this compiler variable can be referred to as a "preprocessor symbolic constant."

The compiler variable can be set to a first value in response to the build indicator being set to an enabled value, and the compiler variable can be set to a second value in response to the build indicator being set to a disabled value. Depending upon the value of the compiler variable, the preprocessor invoked by the compiler can decide whether or not to include the code module into the BIOS executable code. For example, if a code module is specific to a given feature that is to be enabled or disabled, then the preprocessor can include the code module and the BIOS executable code if the compiler variable is set to the first value. On the other hand, if the code module is specific to the given feature, then the preprocessor can exclude the code module from the BIOS executable code if the compiler variable is set to the second value. However, in cases where the code module is not specific to a given feature (but instead includes additional machine-readable instructions that are in addition to machine-readable instructions for the given feature), then the preprocessor will include the code module in the BIOS executable code even if the compiler variable is set to the second value to indicate that the given feature is to be disabled.

The runtime variable promoted (at 112) can be included with metadata of the BIOS executable code. In some examples, the BIOS executable code can include several regions, including a first region for the executable code, a second region for metadata of the BIOS code, and another region for vendor-specific information. The metadata in the metadata region can include various parameters that affect operation of the BIOS code. One of such parameters includes the runtime variable that has been promoted (at 112) from the build indicator.

In some implementations, the runtime variable embedded in the metadata is protected by a signature of the metadata. The metadata can be signed at build time and the signature is verified at runtime of the BIOS code to ensure that the metadata was not tampered with. A signature of the metadata can be cryptographically generated based on a key and the content of the metadata. Without the protection of the runtime variable in the signed metadata, a hacker can potentially change feature settings in the metadata resulting in unexpected or undefined behavior of the BIOS code. Protecting the runtime variable by the signature of the metadata ensures that the enabling or disabling of a given feature at runtime is consistent with that in the other phases.

When the BIOS executable code is executed in the runtime environment 106 in an electronic device, the electronic device can perform (at 116) a runtime check based on the value of the runtime variable. If the runtime variable is set to a first value (indicating that a given feature is enabled), then the runtime check causes a first portion of the BIOS code to be executed to enable the given feature. On the other hand, if the runtime variable is set to a second variable (indicating that the given feature is disabled), then a second portion of the BIOS code is used that does not support the feature.

It is noted that this runtime check based on the value of the runtime variable is performed to address the scenarios where code modules relating to a given feature are included in the BIOS executable code even though the build tool variable and/or compiler variable was set to a second value indicating that the given feature is to be disabled. Such code modules would have been included in the BIOS executable code even though the build tool variable and/or runtime variable was set to the second value if the code modules include both machine-readable instructions specific to the given feature as well as machine-readable instructions for other features.

Figure 2:
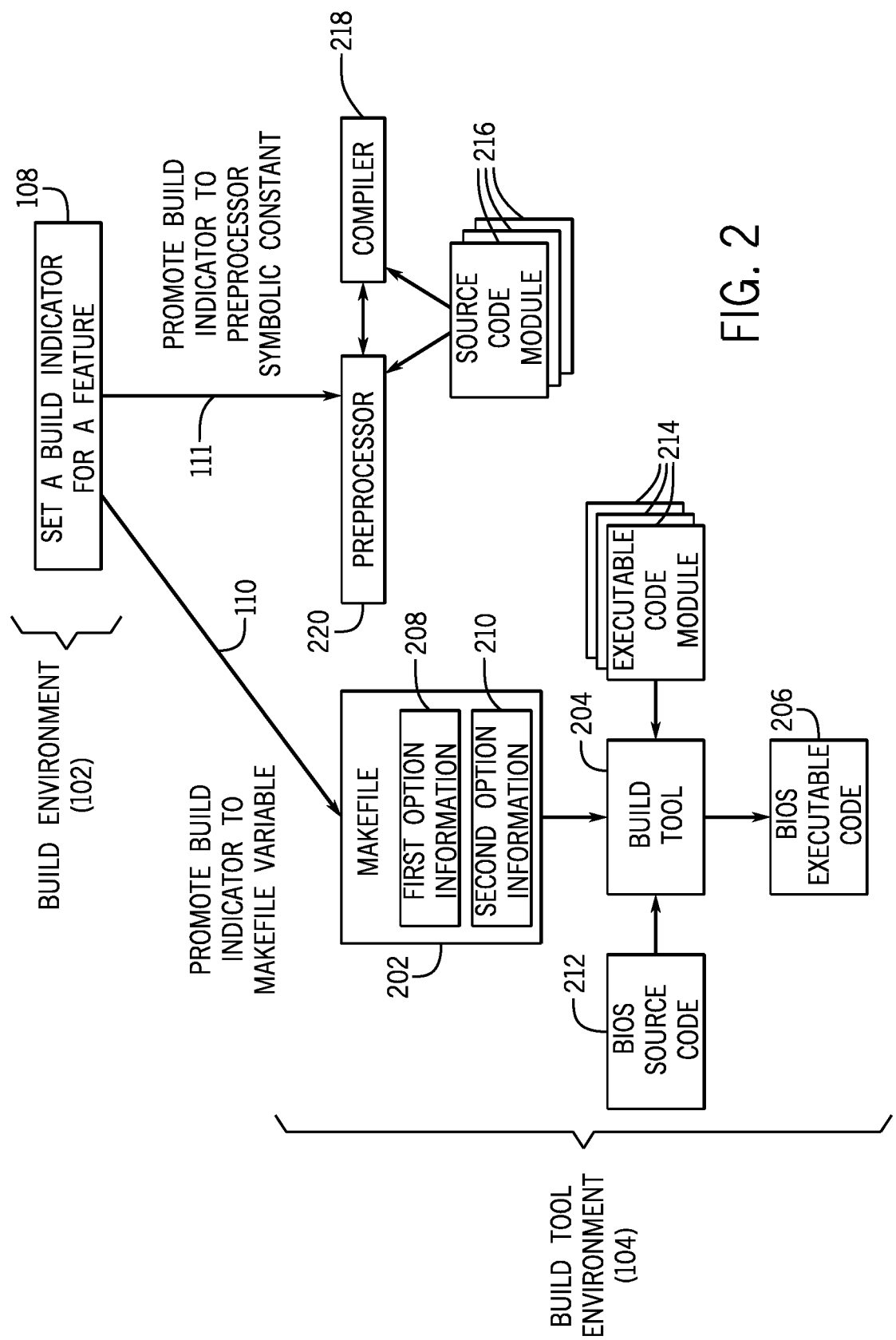

FIG. 2 is a schematic diagram showing tasks and components of the build environment 102 and the build tool environment 104, according to further examples. As depicted in FIG. 2, the build indicator for a given feature is set (at 108) in the build environment 102. This build indicator is promoted (at 110) to a Makefile variable, which is an example of the build tool variable discussed in connection with FIG. 1. In addition, the value of the build indicator is promoted (at 111) to a preprocessor symbolic constant (which is an example of the compiler variable discussed in connection with FIG. 1).

A Makefile 202 is a file that is used by a build tool 204 when building a BIOS executable code 206. The Makefile 202 can include first option information 208 and second option information 210. The first option information 208 is used in cases where the Makefile variable is set to a first value indicating that the given feature is enabled, while the second option information 210 is used in cases where the Makefile variable is set to a second value indicating that the given feature is disabled. The different option information 208 and 210 can include various parameters and other configuration information that can be used to build the BIOS executable code 206. The first option information 208 can include information relating to the given feature, while the second option information 210 can exclude the information relating to the given feature.

The build tool 204 receives BIOS source code 212 and one or multiple executable code modules 214, to build the BIOS executable code 206.

In some examples, the executable code modules 214 may have been provided already to the manufacturer from corresponding vendors, so that the manufacturer would not have to perform compilation of the executable code modules. However, in other examples, code modules relating to a given feature (or multiple given features) that is (are) to be selectively enabled or disabled may be delivered to the manufacturer in source code form, such as source code module(s) 216 shown in FIG. 2. A compiler 218 can be used for compiling the source code module(s) 216. As part of the compilation process, the compiler 218 invokes a preprocessor 220, which applies various preprocessing of the source code module(s) 216 as discussed further above. The preprocessor 220 can use the preprocessor symbolic constant (promoted at 111) from the build indicator, to determine whether or not to include the respective source code module 216 related to the given feature(s) in the BIOS executable code 206.

Figure 3:
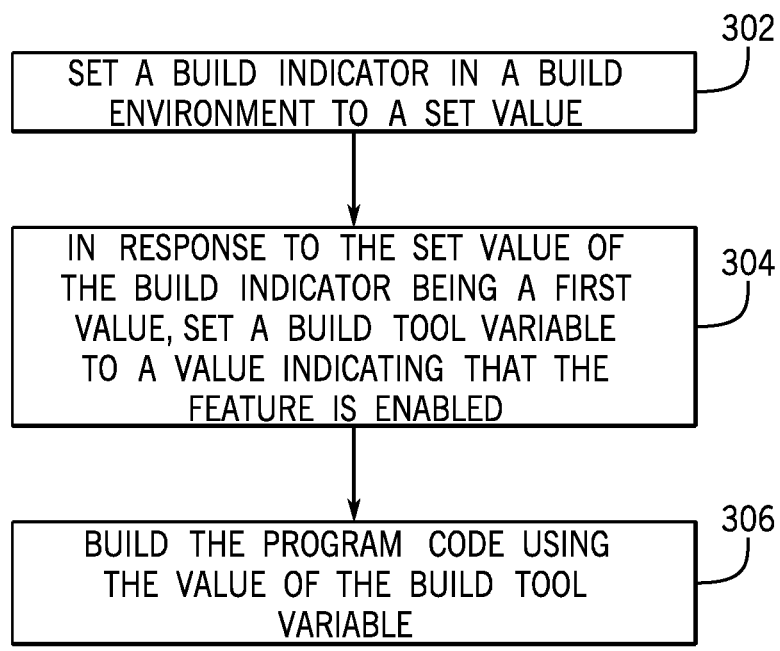
FIG. 3 is a flow diagram of an example process of a manufacturer system, according to some implementations.

FIG. 3 is a flow diagram of an example process that can be formed by a manufacturer system in accordance with some implementations. A manufacturer system can include one or multiple computer systems used by a manufacturer to perform various tasks, including building program code as discussed above.

The process includes setting (at 302) a build indicator (similar to task 108 in FIG. 1 or 2) in a build environment (e.g. 102 in FIGS. 1 and 2) to a set value for building a program code (e.g. a BIOS code), where the set value is selected from a first value indicating that a feature of the program code is enabled, and a second value indicating that the feature is disabled.

In response to the set value of the build indicator being the first value, the process sets (at 304) a build tool variable to a value indicating that the feature is enabled. The process then builds (at 306) the program code using the value of the build tool variable. The building of the program code can be performed by a build tool, such as the build tool 204 shown in FIG. 2.

Figure 4:
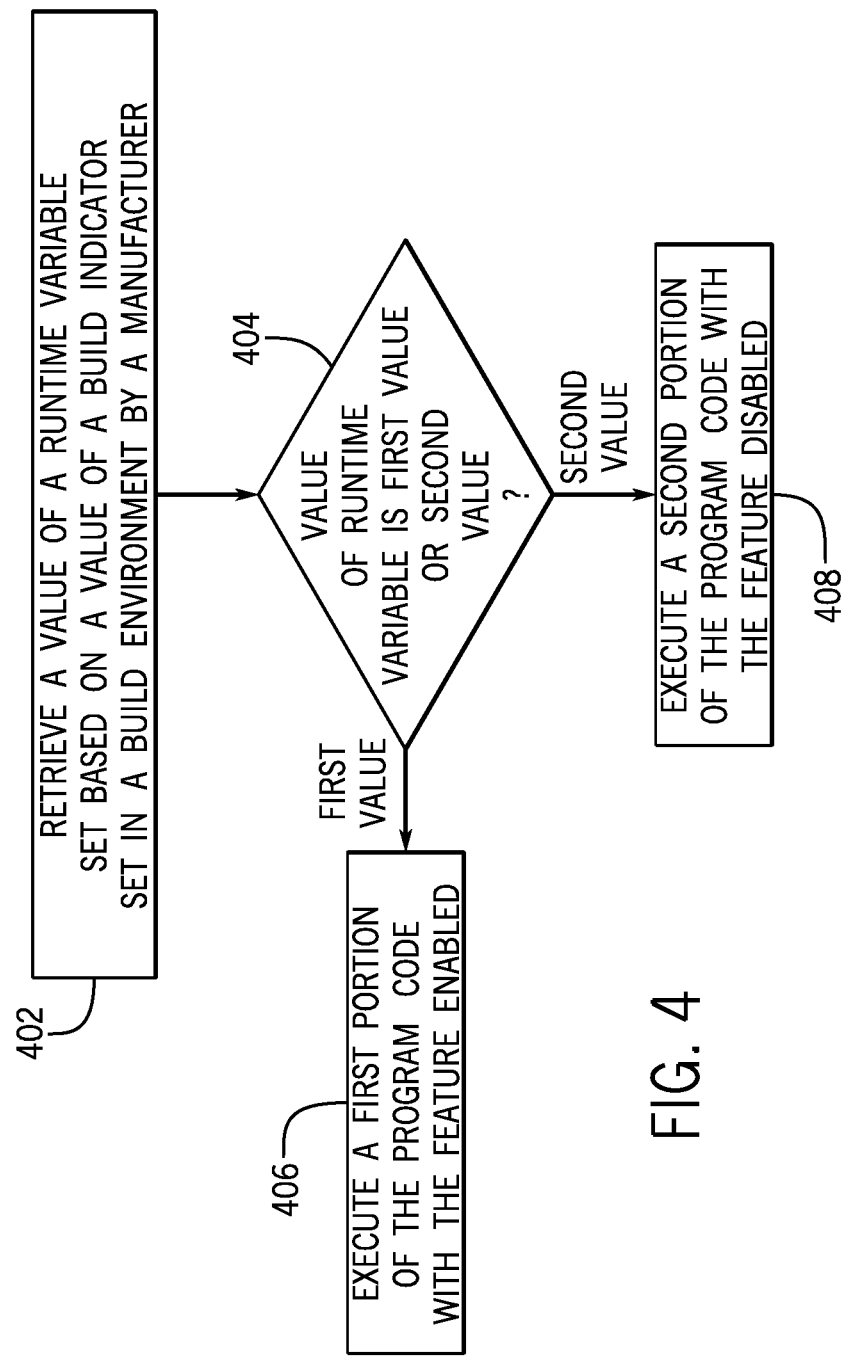
FIG. 4 is a flow diagram of an example process of an electronic device, according to some implementations.

FIG. 4 is a flow diagram of an example process that can be performed by an electronic device during runtime of the electronic device. The process of FIG. 4, retrieves (at 402) a value of a runtime variable associated with a program code, the value of the runtime variable being set based on a value of a build indicator set in a build environment by a manufacturer that provided the program code, the runtime variable being set to a first value in response to the build indicator being set to an enabled value indicating that a feature of the program code is enabled, and the runtime variable being set to a second value in response to the build indicator being set to a disabled value indicating that the feature of the program code is disabled.

The process further determines (at 404) whether the runtime variable has the first value. During execution of the program code in the electronic device, the process executes (at 406) a first portion of the program code with the feature enabled in response to the runtime variable having the first value, and the process executes (at 408) a second portion of the program code with the feature disabled in response to the runtime variable having the second value.

Figure 5:
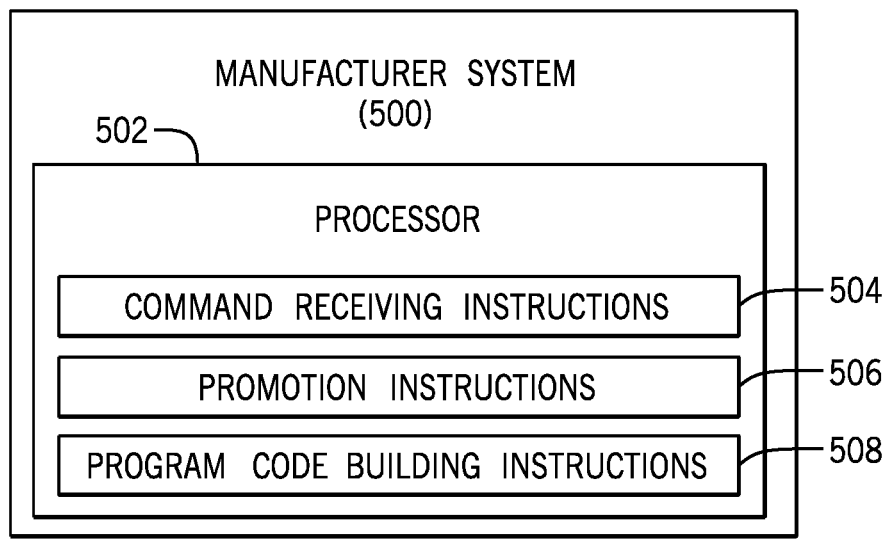
FIG. 5 is a block diagram of an example manufacturer system according to some implementations.

FIG. 5 is a block diagram of an example manufacturer system 500 that can be used by a manufacturer, in accordance with some implementations. The manufacturer system 500 includes a processor (or multiple processors) 502. A processor can include a microprocessor, a microcontroller, a hardware processor module or subsystem, a programmable integrated circuit, a programmable gate array, or other processing hardware. The processor(s) 504 is able to execute various machine-readable instructions, including command receiving instructions 504 to set a build indicator to a first value or a second value (e.g. task 108 in FIG. 1 or 2 or task 302 in FIG. 3), promotion instructions 506 to promote the build indicator to a build tool variable and a runtime variable (e.g. tasks 110 and 112 in FIG. 1), and program code building instructions 508 (e.g. such as the build tool 204) to build program code according to a value to which the build tool variable is set.

Figure 6:
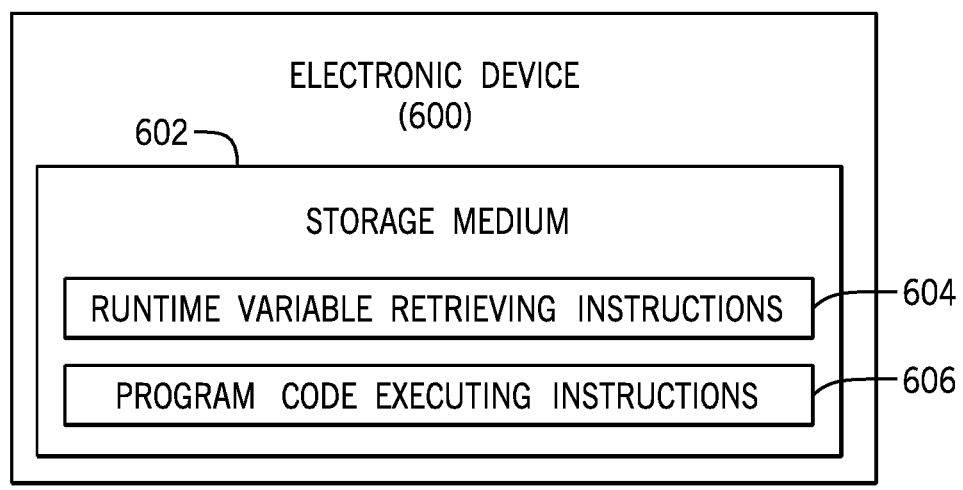
FIG. 6 is a block diagram of an example electronic device according to some implementations.

FIG. 6 is a block diagram of an example electronic device 600 that includes a non-transitory machine-readable storage medium (or storage media) 602 to store machine-readable instructions that upon execution cause the electronic device 600 to perform various tasks during runtime. The machine-readable instructions stored in the machine-readable storage medium 602 include runtime variable retrieving instructions 604 to retrieve a value of a runtime variable associated with a program code (e.g. task 402 in FIG. 4), and program code execution instructions 606 to execute different portions of the program code depending on the value of the runtime variable (e.g. tasks 406 and 408 in FIG. 4).

The storage medium (or storage media) 602 can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   setting, in a system comprising a processor, a build indicator in a build environment to a set value for building a program code, the set value selected from a first value indicating that a feature of the program code is enabled, and a second value indicating that the feature is disabled;
   in response to the set value of the build indicator being the first value, setting, by the system, a first variable to a value indicating that the feature is enabled;
   in response to the set value of the build indicator being the second value, setting, by the system, the first variable to a value indicating that the feature is disabled;
   building, by the system, the program code using the set value of the first variable;
   in response to the set value of the build indicator being the first value, setting, by the system, a runtime variable to a value indicating that the feature is enabled, wherein the runtime variable being set to the value indicating that the feature is enabled causes a runtime check of the program code to use a portion of the program code that enables the feature; and
   in response to the set value of the build indicator being the second value, setting, by the system, the runtime variable to a different value indicating that the feature is disabled, wherein the runtime variable being set to the different value indicating that the feature is disabled causes the runtime check of the program code to use a different portion of the program code with the feature disabled.

2. The method of claim 1, wherein the building of the program code includes including, in the program code, a code module for the feature in response to the first variable set to the value indicating that the feature is enabled.

3. The method of claim 2, wherein the building of the program code includes excluding, from the program code, the code module in response to the first variable set to the value indicating that the feature is disabled.

4. The method of claim 1,
wherein the building of the program code responsive to the first variable being set to the value indicating that the feature is disabled comprises:
determining whether a code module is specific to the feature,
in response to determining that the code module is specific to the feature, excluding, from the program code, the code module for the feature in response to the first variable being set to the value indicating that the feature is disabled, and
in response to determining that the code module includes machine-readable instructions for the feature and machine-readable instructions for another feature, including the code module in the program code in response to the first variable being set to the value indicating that the feature is disabled.

5. The method of claim 1, wherein a code module for the feature is in source code form, the method further comprising:
in response to the set value of the build indicator being the first value, setting, by the system, a compiler variable to a value indicating that the feature is enabled;
in response to the compiler variable set to the value indicating that the feature is enabled, causing, by a compiler, compilation of a source code of the code module to include the code module in the program code.

6. The method of claim 1, further comprising:
in response to the set value of the build indicator being the first value, including, by the system in a makefile, information relating to building the program code with the feature enabled.

7. The method of claim 1, wherein the feature comprises a feature to restore the program code from secure storage in response to corruption of the program code at runtime.

8. The method of claim 1, wherein the feature comprises a feature to cause an embedded controller of an electronic device in which the program code executes to contact a predetermined destination to address an issue detected at the electronic device.

9. The method of claim 1, wherein the feature comprises a driver of the program code that accesses a remote server.

10. The method of claim 1, wherein the runtime check of the program code is performed during execution of the program code.

11. A system comprising:
a processor; and
a non-transitory storage medium storing instructions executable on the processor to:
receive, in a build environment, a command to set a build indicator to a first value or a second value, the first value indicating that a feature of a program code is enabled, and the second value indicating that the feature is disabled;
promote the build indicator to a build tool variable and a runtime variable, wherein the promoting comprises:
setting the build tool variable to a value indicating that the feature is enabled in response to the build indicator being set to the first value, and setting the build tool variable to a value indicating that the feature is disabled in response to the build indicator being set to the second value,
setting the runtime variable to a value indicating that the feature is enabled in response to the build indicator being set to the first value, and setting the runtime variable to a value indicating that the feature is disabled in response to the build indicator being set to the second value, wherein the runtime variable being set to the value indicating that the feature is enabled is to cause a runtime check of the program code to use a portion of the program code that enables the feature, and wherein the runtime variable being set to the value indicating that the feature is disabled causes the runtime check of the program code to use a different portion of the program code with the feature disabled; and
build the program code according to a value to which the build tool variable is set.

12. The system of claim 11, wherein the instructions are executable on the processor to further include the runtime variable in metadata associated with the program code, the metadata protected by a signature.

13. The system of claim 11, wherein the building of the program code according to the value of the build tool variable comprises:
including, in the program code, a code module for the feature in response to the build tool variable being set to the value indicating that the feature is enabled; and
excluding, from the program code, the code module for the feature in response to the build tool variable being set to the value indicating that the feature is disabled.

14. The system of claim 11, wherein the instructions are executable on the processor to further:
promote the build indicator to a compiler variable, comprising:
setting the compiler variable to a value indicating that the feature of the program code is enabled in response to the build indicator being set to the first value, and setting the compiler variable to a value indicating that the feature of the program code is disabled in response to the build indicator being set to the second value,
wherein the building of the program code according to the value of the build tool variable comprises using a compiler to:
include, in the program code, a code module for the feature in response to the compiler variable being set to the value indicating that the feature is enabled; and
exclude, from the program code, the code module for the feature in response to the compiler variable being set to the value indicating that the feature is disabled.

15. The system of claim 11, wherein the program code comprises a basic input/output system (BIOS) code.

16. A non-transitory machine-readable storage medium storing instructions that upon execution cause a system to:
set a build indicator in a build environment to a set value for building a program code, the set value selected from a first value indicating that a feature of the program code is enabled, and a second value indicating that the feature is disabled;
in response to the set value of the build indicator being the first value, set a first variable to a value indicating that the feature is enabled;
in response to the set value of the build indicator being the second value, set the first variable to a value indicating that the feature is disabled;

build the program code using the set value of the first variable;

in response to the set value of the build indicator being the first value, set a runtime variable to a value indicating that the feature is enabled, wherein the runtime variable being set to the value indicating that the feature is enabled causes a runtime check of the program code to use a portion of the program code that enables the feature; and in response to the set value of the build indicator being the second value, set the runtime variable to a different value indicating that the feature is disabled, wherein the runtime variable being set to the different value indicating that the feature is disabled causes the runtime check of the program code to use a different portion of the program code with the feature disabled.

17. The non-transitory machine-readable storage medium of claim 16, wherein the runtime variable is in metadata associated with the program code.

18. The non-transitory machine-readable storage medium of claim 16, wherein the program code comprises a basic input/output system (BIOS) code.

* * * * *